Jan. 17, 1961  J. WERNER  2,968,513
GUIDE MECHANISM

Filed July 19, 1957  2 Sheets-Sheet 1

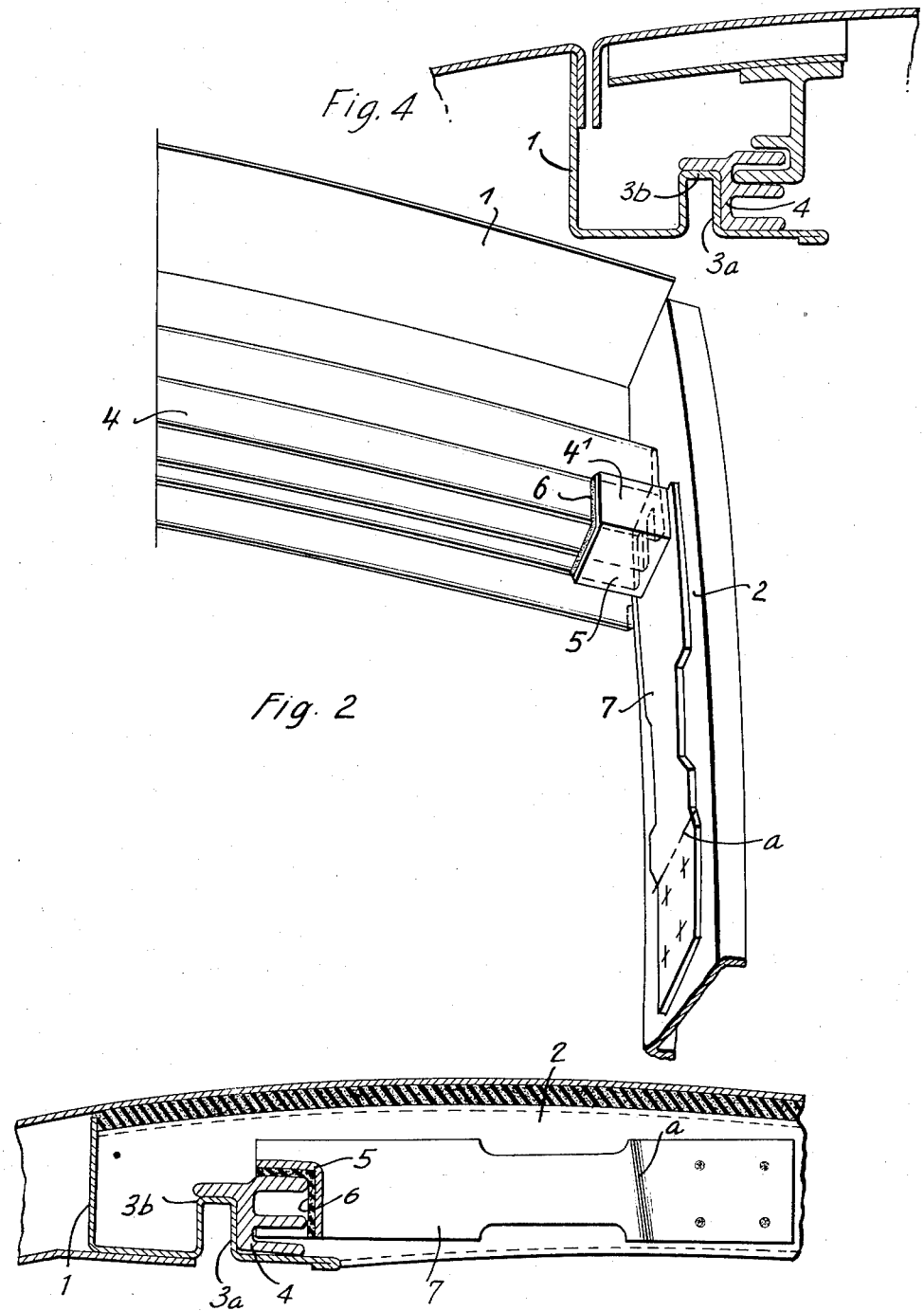

United States Patent Office 2,968,513
Patented Jan. 17, 1961

2,968,513

GUIDE MECHANISM

Johannes Werner, Wilhelm-Leuschner-Strasse 33,
Offenbach (Main), Germany

Filed July 19, 1957, Ser. No. 672,892

Claims priority, application Germany Feb. 21, 1957

5 Claims. (Cl. 296—137)

This invention relates to guides for slides, and more particularly to mechanisms which further function to fix guides in position when they are in their proper positions.

A preferred application of guide mechanisms provided in accordance with the invention is in connection with slidable and detachable roofs for vehicles. Specifically, a roof provided in detachable manner for a vehicle is usually mounted on a slide which engages and slides along a guide or rail fixed to the vehicle. Normally, when in position, the roof guide is bolted or screwed to the vehicle at both of its ends.

It is an object of the invention to provide an improved guide mechanism for the slidable roof of a vehicle which mechanism incorporates a novel and useful locking mechanism. Advantageously, this provision avoids the necessity of fastening the roof guide in position at least at one of its ends since the locking function incorporated into the guide mechanism obviates this need.

It is a further object of the invention to provide an improved guide mechanism which although being relatively simple and inexpensive to construct efficiently performs its guiding function.

Still another object of the invention is to provide for the ready detachment of the roof guide of a vehicle so as to facilitate the demounting thereof.

A further object of the invention is to provide a guide mechanism which requires little or no maintenance although being extremely reliable.

It is still another object of the invention to provide a guide mechanism which is relatively insensitive to tolerances of its parts and also to irregularities in the movement thereof.

Briefly, the invention in achieving its objectives contemplates utilizing a mechanism which inherently executes a movement towards the guide rail or other such device along which an associated slide moves. An engaging member is provided, for example, on a flexible or resilient lever which supports the engaging member for an arcuate movement towards the guide rail which consequently is engaged in a fashion to be hereinafter described in detail and urged into its ultimate position and locked.

A preferred embodiment of the invention will next be described in greater detail so as to indicate more clearly its various features and objects as well as its advantages. The preferred embodiment is illustrated in the accompanying drawing in which:

Figure 2 shows the apparatus of Fig. 1 with the rail engaged and locked in position;

Figure 4 is a transverse sectional view of the apparatus including a slidable roof; and Figure 5 is a further transverse sectional view taken through the engaging member.

Figure 1:
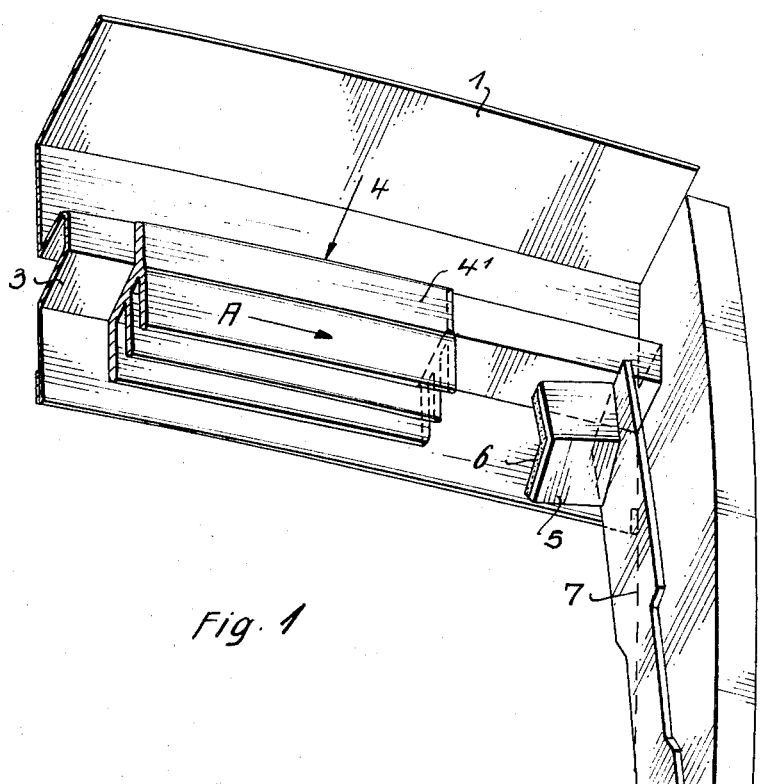
Figure 1 illustrates a guide rail mounted on a brace in a position whereat it is about to be engaged by a mechanism provided in accordance with the invention.
Figure 3:
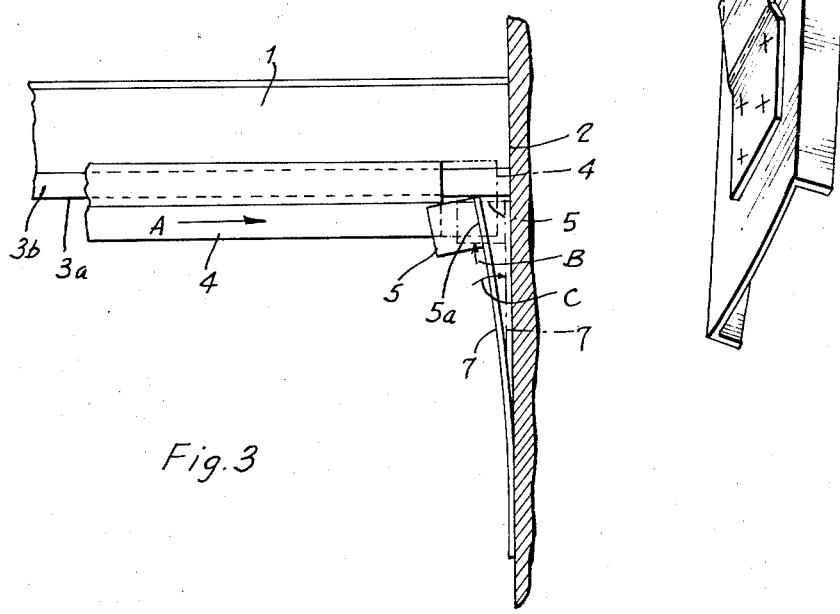
Figure 3 is a top plan view of the apparatus of Figures 1 and 2 with the rail in an initial stage of engagement.

In Fig. 1, attention is directed to the fact that the rail is shown partially broken away so that an understanding of its construction is facilitated.

Assuming the associated apparatus to be a vehicle with a detachable roof R (Fig. 4), there is shown a beam or brace 1 defining the right rear end at the top of the vehicle and a rear brace 2 arranged at the rear and top T (Fig. 4) of the vehicle at a right angle to the beam 1. The beam 1 is furthermore connected by a flange to a channel 3 which constitutes a support for a guide rail 4.

The guide rail 4 is illustrated as being a beam of E-shaped cross-section, the upper section 4' of which extends across the upright section of the beam to engage atop the channel 3. In fact, the guide rail 4 defines a peripheral configuration adapted to mate with the channel 3.

The inner channels of the guide rail 4 are adapted to accommodate a slide (not shown) on which is mounted a slidable roof (not shown). The guide rail 4 is slid into position for the above function in the direction of the arrow A towards the rear of the vehicle.

The locking mechanism provided in accordance with the invention is fastened to the brace 2 which constitutes a base or support therefor. It consists of an elbow or engaging member 5 defining a recess of right-angled cross-section for mating with the corresponding periphery of the guide rail 4. In the recess is fixed a friction or elastic member 6 made, for example, of rubber.

The engaging member 5 is mounted on a flexible and resilient lever 7 and preferably at the end thereof. This lever may be independently either flexible or resilient but preferably these characteristics are combined.

Normally, the engaging member 5 is maintained at a position which is spaced both from the brace 3 and the brace 2. This is due to a break in the linearity of the lever 7 adjacent the region at which it is welded to the brace 2.

In this position, the engaging member is adapted to receive the guide rail 4 and it will be noted that the elbow 5, so positioned, can readily accommodate tolerances in the size of the rail 4 as well as deviations in its movement along the channel 3.

The member 6 is in effect a friction member which causes the elbow 5 to move with the rail 4 toward the rear of the vehicle and towards the position whereat the guide rail 4 is firmly positioned unless removed for maintenance or the like. As the engaging member 5 moves rearwardly, it also moves toward the channel 3 since the lever 7 restricts the movement thereof to an arcuate path the radii of which are determined by the length of the lever 7.

In so moving, the elbow 5 urges the rail 4 into tight and intimate engagement with the channel 3 so that the rail 4 is effectively locked thereagainst. In fact, as the rail 4 moves into abutting position with the brace 2, it is rigorously pressed against the channel 3 by the elbow 5.

The guide rail for the slidable roof is thus moved into a position at which it is locked. The front end of the guide can be bolted or screwed to the vehicle if this additional precaution is warranted. However, even if this is the case, the locking mechanism provided in accordance with the invention has nevertheless obviated the need for fastening by more positive means the rearmost end of the guide. Moreover, since this end may be concealed or unapproachable due to other accessories on the vehicle, the operation is greatly facilitated by the invention. Furthermore, removal of the guide is a simple operation.

The lever 7 and the associated elbow 5 are simply designed and thus susceptible to mass production at low costs both with respect to labor and materials. The lever 7 can be made, for example, from steel or any other flexible, resilient and easily worked material of appropriate strength.

Attention is further directed to the fact that pivotal axis *a* of lever 7 is inclined relative to the guide rail 4 so that an inward or transverse movement is imparted to elbow 5 as the guide rail 4 is inserted.

There will now be obvious to those skilled in the art many modifications and variations of the apparatus set forth which do not depart essentially from the scope of the invention as defined in the following claims.

What is claimed is:

1. A device for fastening a guiding rail for a slidable roof on a support carried by a vehicle, the rail having a determinable path of insertion into said vehicle, comprising an engaging member including two mutually perpendicular flanges for engaging the rail on two sides thereof, a flexible lever connected to said engaging member and extending substantially transversely of said rail, a cross member carried by the vehicle supporting said flexible lever for pivotal movement about a pivotal axis spaced substantially from said engaging member, said flexible lever positioning said engaging member normally at a position spaced from said support for engaging said rail, and means on said lever normally in the path of said rail for displacement of the lever, the flexibility of said flexible lever enabling said means and thereby the engaging member to move with the rail, the position of said lever restricting the movement of the engaging member to an arc approaching the support whereby the engaging member locks the rail against the support.

2. A device as claimed in claim 1 wherein the flexible lever is a resilient member.

3. A device as claimed in claim 1 wherein the cross member is a beam connected to the support, the connection of said flexible lever to said cross member being spaced from the engaging member by a distance which is less than the distance between said connection and the support.

4. A device as claimed in claim 1 comprising elastic means on said engaging member for engaging the slide.

5. A device as claimed in claim 1 wherein the pivotal axis is inclined to the rail.

References Cited in the file of this patent

UNITED STATES PATENTS

| | | |
|---|---|---|
| 188,325 | Winans | Mar. 13, 1877 |
| 1,581,208 | Hayes | Apr. 20, 1926 |
| 1,718,183 | Smith | June 18, 1929 |
| 2,065,590 | Jennings | Dec. 29, 1936 |
| 2,675,055 | Singleton | Apr. 13, 1954 |
| 2,772,917 | Goldman | Dec. 4, 1956 |